(12) United States Patent
Sun et al.

(10) Patent No.: US 11,592,983 B2
(45) Date of Patent: Feb. 28, 2023

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Lei Sun, Beijing (CN); Jian Gao, Beijing (CN); Xinlei Xu, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 17/316,960

(22) Filed: May 11, 2021

(65) Prior Publication Data

US 2022/0214806 A1   Jul. 7, 2022

(30) Foreign Application Priority Data

Jan. 6, 2021  (CN) .......................... 202110014398.4

(51) Int. Cl.
*G06F 3/06* (2006.01)

(52) U.S. Cl.
CPC .......... *G06F 3/0604* (2013.01); *G06F 3/0655* (2013.01); *G06F 3/0689* (2013.01)

(58) Field of Classification Search
CPC ............................ G06F 3/0604; G06F 3/0655
See application file for complete search history.

(56) References Cited

U.S. PATENT DOCUMENTS

| | | | |
|---|---|---|---|
| 8,402,226 B1 | 3/2013 | Faibish et al. | |
| 8,732,409 B2 | 5/2014 | Van Der Wolf et al. | |
| 11,210,229 B2 | 12/2021 | Jia et al. | |
| 2005/0278486 A1 | 12/2005 | Trika | |
| 2011/0099200 A1* | 4/2011 | Blount | G06F 16/152 |
| | | | 714/E11.03 |
| 2015/0098563 A1* | 4/2015 | Gulley | H04L 9/0643 |
| | | | 380/28 |
| 2017/0315865 A1* | 11/2017 | Fisher | G06F 16/215 |

* cited by examiner

*Primary Examiner* — Gary W. Cygiel
(74) *Attorney, Agent, or Firm* — BainwoodHuang

(57) ABSTRACT

Storage management techniques involve: acquiring target data in a target storage page in a memory; determining, based on the target data, check information and identification information associated with the target data, the check information being used to verify whether the target data is correct and the identification information being used to identify the target data; and determining, based on the identification information, storage information associated with the target data and the check information, the storage information indicating whether to store the target data and the check information to a persistent storage device. Therefore, the processing efficiency can be improved, and the input/output (I/O) performance can be improved.

11 Claims, 4 Drawing Sheets

METHOD, ELECTRONIC DEVICE AND COMPUTER PROGRAM PRODUCT FOR STORAGE MANAGEMENT

CROSS-REFERENCE TO RELATED APPLICATION

This application claims priority to Chinese Patent Application No. CN202110014398.4, on file at the China National Intellectual Property Administration (CNIPA), having a filing date of Jan. 6, 2021 and having "METHOD, ELECTRONIC DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure relate generally to storage management, and in particular, to a method, an electronic device, and a computer program product for storage management.

BACKGROUND

In order to improve the efficiency of data processing, data in persistent storage devices such as Redundant Arrays of Independent Disks (RAID) will be loaded into a memory for use during task execution. During task execution, the data in the memory may be temporarily updated, while the corresponding data in the persistent storage devices has not been updated. In this case, the temporarily updated data may be referred to as dirty data. The dirty data will be refreshed to the persistent storage devices to update the corresponding data in the persistent storage devices. Before refreshed, the dirty data needs to be preprocessed. However, conventional preprocessing processes are inefficient.

SUMMARY OF THE INVENTION

Embodiments of the present disclosure provide a method, an electronic device, and a computer program product for storage management.

In a first aspect of the present disclosure, a method for storage management is provided. The method includes: acquiring target data in a target storage page in a memory; determining, based on the target data, check information and identification information associated with the target data, the check information being used to verify whether the target data is correct and the identification information being used to identify the target data; and determining, based on the identification information, storage information associated with the target data and the check information, the storage information indicating whether to store the target data and the check information to a persistent storage device.

In a second aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to perform actions. The actions include: acquiring target data in a target storage page in a memory; determining, based on the target data, check information and identification information associated with the target data, the check information being used to verify whether the target data is correct and the identification information being used to identify the target data; and determining, based on the identification information, storage information associated with the target data and the check information, the storage information indicating whether to store the target data and the check information to a persistent storage device.

In a third aspect of the present disclosure, a computer program product is provided. The computer program product is tangibly stored on a non-transitory computer-readable medium and includes machine-executable instructions. The machine-executable instructions, when executed, cause a machine to implement any step of the method described according to the first aspect of the present disclosure.

The Summary of the Invention section is provided to introduce the selection of concepts in a simplified form, which will be further described in the Detailed Description below. The Summary of the Invention section is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent through a more detailed description of example embodiments of the present disclosure with reference to the accompanying drawings. In the example embodiments of the present disclosure, the same reference numerals generally represent the same components.

In the accompanying drawings, the same or corresponding numerals represent the same or corresponding parts.

DETAILED DESCRIPTION

Figure 1:
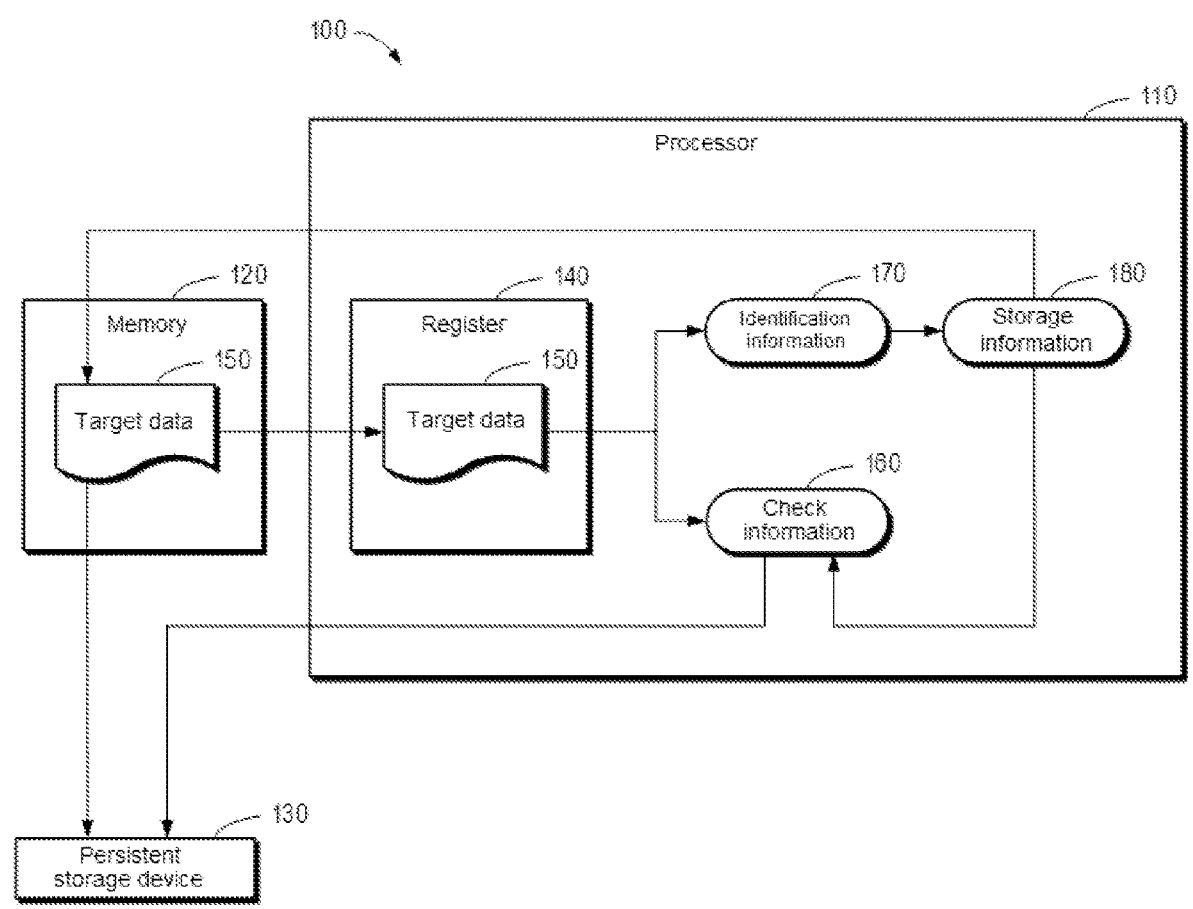
FIG. 1 shows a schematic diagram of an example of a storage management environment in which some embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" means "at least one further embodiment." The terms "first," "second," and the like may refer to different or the same objects. Other explicit and implicit definitions may also be included below.

As described above, before refreshed, dirty data needs to be preprocessed. In some cases, data in a memory may be organized in a unit of storage page. Each storage page has a predetermined size, such as 4 kilobytes (4 KB). In this case, dirty data may be referred to as dirty storage page data. In the preprocessing process of the dirty storage page data, a cyclic redundancy check (CRC) value needs to be calculated to verify data consistency, and then a non-encrypted hash value is calculated to search for data in a persistent storage device that is duplicated with the dirty storage page data.

Conventionally, the calculations for a CRC value and a non-encrypted hash value are independent. In the CRC, it is necessary to load 8-byte (8 B) dirty storage page data from a memory to a register each time, and cyclically traverse the dirty storage page data to perform the CRC calculation. In the non-encrypted hash calculation, the same process needs to be repeated. That is, in the non-encrypted hash calculation, it is also necessary to load 8 B dirty storage page data from a memory to a register each time, and cyclically traverse the dirty storage page data to perform the non-encrypted hash calculation. A 4 KB storage page needs to be loaded for a total of 4096/8*2=1024 times.

According to an example embodiment of the present disclosure, an improved solution for storage management is proposed. In this solution, target data in a target storage page in a memory may be acquired. Check information and identification information associated with the target data may be determined based on the target data. The check information is used to verify whether the target data is correct. The identification information is used to identify the target data. Therefore, storage information associated with the target data and the check information may be determined based on the identification information. The storage information indicates whether to store the target data and the check information in a persistent storage device.

In this way, this solution may determine check information and identification information simultaneously in a data loading cycle during the preprocessing of dirty storage page data, so as to avoid cyclically traversing the dirty storage page data twice for the check information and the identification information. Because a single cycle is used to replace two cycles for storage page refreshing, the amount of data to be loaded may be halved, thereby reducing CPU (Center Processing Unit) loads, saving CPU cycles, improving CPU efficiency, and improving IO (Input/Output) performance.

The embodiments of the present disclosure will be specifically described below with reference to the accompanying drawings.

FIG. 1 shows a schematic diagram of an example of storage management environment 100 in which some embodiments of the present disclosure can be implemented. Storage management environment 100 includes processor 110, memory 120, and persistent storage device 130. As an example, processor 110 may be any device with a computing capability. For example, processor 110 may be a processor of a personal computer, a tablet computer, a wearable device, a cloud server, a mainframe, a distributed computing system, and the like.

Memory 120 may be any device with a storage capability. For example, the memory may be a volatile memory such as a SDRAM (Synchronous Dynamic random access memory) and a DDR SDRAM (Double Data Rate Synchronous Dynamic random access memory). Similarly, persistent storage device 130 may be any device with a storage capability. Unlike memory 120, persistent storage device 130 may be a non-volatile memory such as a magnetic disk, a solid state drive, and a RAID.

In storage management environment 100, processor 110 is configured to perform storage management. As described above, data in memory 120 may be organized in a unit of storage page. Each storage page has a predetermined size, such as 4 kilobytes (4 KB). During task execution, data in some storage pages in memory 120 may be temporarily updated, while corresponding data in persistent storage device 130 has not been updated. In this case, the temporarily updated data may be referred to as dirty storage page data. Such dirty storage page data may be used as target data 150, and target data 150 will be refreshed into persistent storage device 130 to update the corresponding data in persistent storage device 130.

Before refreshing, processor 110 may perform preprocessing. Specifically, during the preprocessing, processor 110 may determine check information 160 and identification information 170 of target data 150 simultaneously in a data loading cycle. Check information 160 is used to verify whether target data 150 is correct. For example, in a case where the target data is stored in persistent storage device 130, check information 160 may be used to verify the consistency of target data 150 when target data 150 is read from persistent storage device 130 in the future. Identification information 170 is used to identify the target data. For example, identification information 170 may be used to find out whether target data 150 has been stored in persistent storage device 130. Therefore, because check information 160 and identification information 170 are determined simultaneously in a data loading cycle, it is possible to avoid cyclically traversing storage page data 150 twice for check information 160 and identification information 170.

In some embodiments, processor 110 includes register 140. In this case, processor 110 may load target data 150 from memory 120 into register 140, and determine check information 160 and identification information 170 based on target data 150. Further, processor 110 may determine storage information 180 based on identification information 160. Storage information 180 indicates whether to store target data 150 and check information 160 in persistent storage device 130, that is, whether to refresh target data 150 and check information 160 to persistent storage device 130. Hereinafter, the storage management operations performed by processor 110 will be described in detail with reference to FIGS. 2 and 3.

Figure 2:
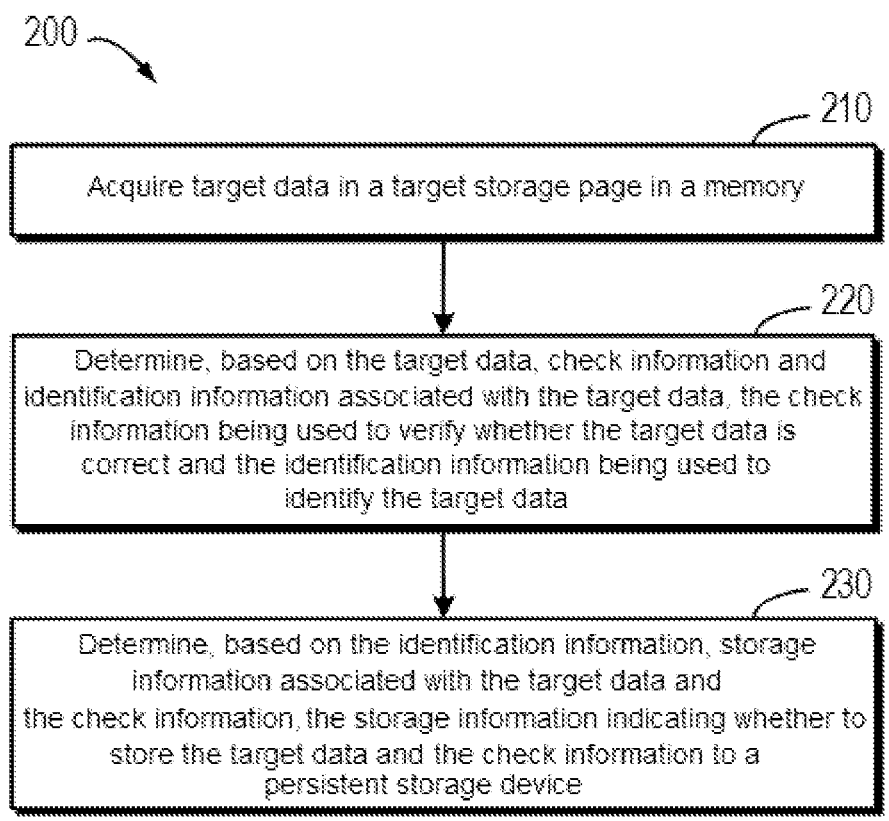
FIG. 2 shows a flow chart of an example of a method for storage management according to some embodiments of the present disclosure.

FIG. 2 shows a flow chart of method 200 for storage management according to some embodiments of the present disclosure. Method 200 may be implemented by processor 110 as shown in FIG. 1. Alternatively, method 200 may also be implemented by other entities besides processor 110. It should be understood that method 200 may further include additional steps that are not shown and/or may omit the shown steps, and the scope of the present disclosure is not limited in this aspect.

At 210, processor 110 acquires target data 150 in a target storage page in memory 120. In some embodiments, refreshing is initiated only when the number of storage pages with dirty data exceeds a threshold number (e.g., 2048 storage pages). In view of this, processor 110 may determine whether the number of at least one candidate storage page in memory 120 exceeds a threshold number. For example, these candidate storage pages may be storage pages with dirty data. If the number exceeds the threshold number, processor 120 may determine the target storage page from these candidate storage pages.

In addition, as described above, in some embodiments, processor 110 includes register 140. In this case, processor 110 may load target data 150 from memory 120 into register 140 to acquire target data 150. In some embodiments, because the storage space size of register 140 is generally smaller than the size of target data 150, a plurality of portions of target data 150 may be loaded from memory 120 to register 140 respectively. For example, the size of target data 150 may be 4 KB. In this case, a portion (e.g., 8 B) of target data 150 may be loaded from memory 120 to register 140 in each cycle until target data 150 is cyclically traversed.

At 220, processor 110 determines check information 160 and identification information 170 associated with target data 150 based on target data 150. Check information 160 is used to verify whether target data 150 is correct. In some embodiments, processor 110 may perform a check operation on target data 150 to determine check information 160. In this case, check information 160 may be a check value obtained after performing the check operation on target data 150. For example, the check operation may include a parity check operation, a CRC operation, a BCC (Block Check Character) XOR check operation, etc. In some embodiments, processor 110 may also allocate a buffer for check information 160 to store check information 160.

Identification information 170 is used to identify target data 150. In some embodiments, processor 110 may perform a hash operation on target data 150 to determine identification information 170. In this case, identification information 170 may be a hash value obtained after performing the hash operation on target data 150. For example, the hash operation may include non-encrypted hash operations such as MurmurHash, xxHash, and SipHash. The non-encrypted hash operations are suitable for hash-based searching. Unlike encrypted hash operations, the non-encrypted hash operations are not specifically designed to be difficult to reverse, making them unsuitable for encryption purposes.

In some embodiments, when a plurality of portions of target data 150 are loaded from memory 120 into register 140, processor 110 may perform check operations on the plurality of portions of target data 150 respectively to generate a first group of intermediate values, and determine check information 160 based on the first group of intermediate values. When a buffer is allocated, the first group of intermediate values may also be stored in the buffer. Similarly, processor 110 may perform hash operations on the plurality of portions of target data 150 respectively to generate a second group of intermediate values, and determine identification information 170 based on the second group of intermediate values.

For example, in a case where one portion of target data 150 is loaded from memory 120 into register 140, processor 110 may perform a check operation on this portion to generate an intermediate value associated with check information 160, and may also perform a hash operation on this portion to generate another intermediate value associated with identification information 170. In addition, in some embodiments, the intermediate value associated with check information 160 may also be stored in the allocated buffer.

Figure 3:
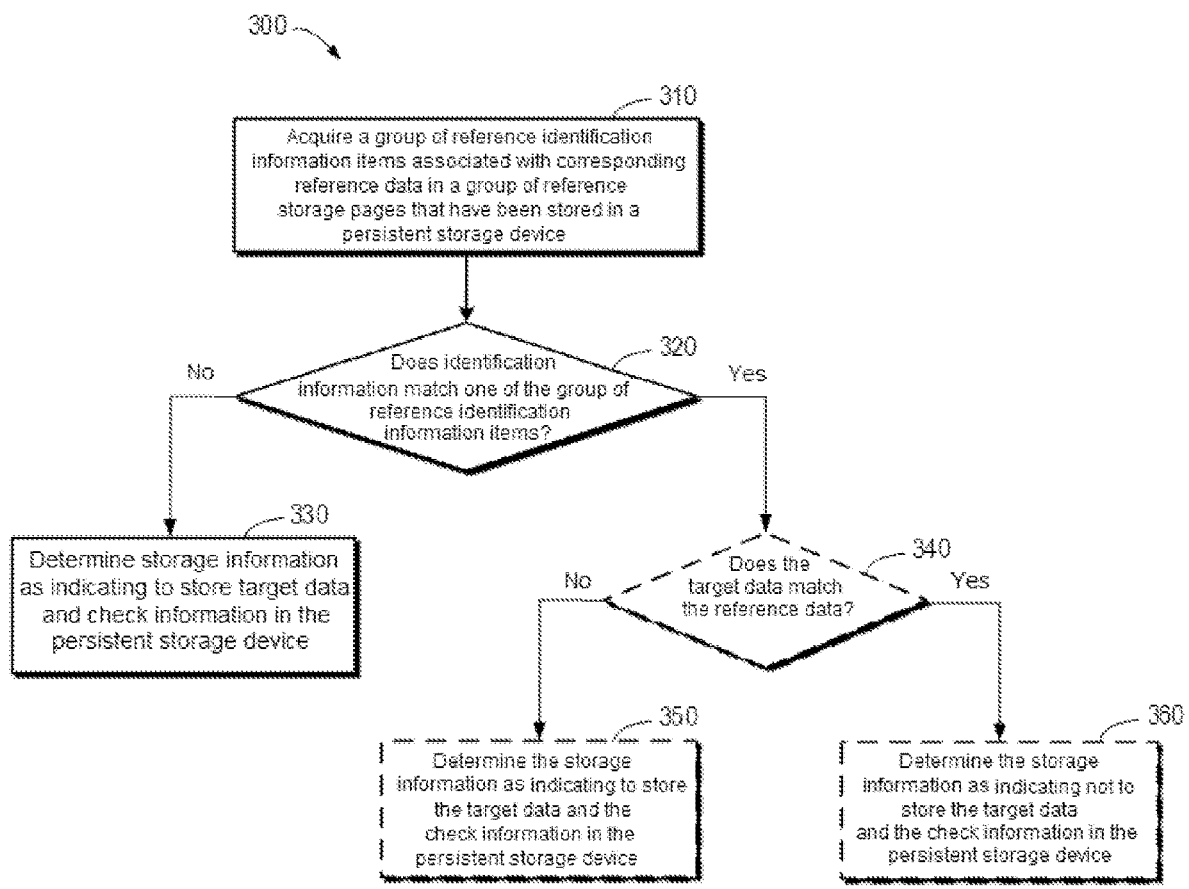
FIG. 3 shows a flow chart of an example of a method for determining storage information according to some embodiments of the present disclosure.

At 230, processor 110 determines storage information 180 associated with target data 150 and check information 160 based on identification information 170. Storage information 180 indicates whether to store target data 150 and check information 160 in persistent storage device 130. Hereinafter, the operation of determining storage information performed by processor 110 will be described in detail with reference to FIG. 3. FIG. 3 shows a flow chart of an example of method 300 for determining storage information according to some embodiments of the present disclosure.

In some embodiments, processor 110 may perform data deduplication before refreshing. Therefore, at 310, processor 110 may acquire a group of reference identification information items associated with corresponding reference data in a group of reference storage pages that have been stored in persistent storage device 130. At 320, processor 110 may compare identification information 170 with the group of reference identification information items respectively.

If identification information 170 does not match each of the group of reference identification information items, it means that target data 150 has not been yet stored in persistent storage device 130. In this case, at 330, processor 110 may determine storage information 180 as indicating to store target data 150 and check information 160 in persistent storage device 130.

If identification information 170 matches one of the group of reference identification information items, it means that target data 150 has been stored in persistent storage device 130. In this case, processor 110 may determine storage information 180 as indicating not to store target data 150 and check information 160 in persistent storage device 130. In some embodiments, processor 110 may mark the target storage page or the reference storage page corresponding to the matched reference identification information item as a duplicate storage page. In addition, in some embodiments, target data 150 stored in persistent storage device 130 may have a reference count value. In a case where it is determined that target data 150 has been stored in persistent storage device 130, processor 110 may increase the reference count value of target data 150 progressively to record the number of times when target data 150 is referenced. Therefore, data deduplication may be achieved.

In some embodiments, in order to ensure the correct determination of whether target data 150 has been stored in persistent storage device 130, in the case where identification information 170 matches one of the group of reference identification information items, at 340, processor 110 may also compare target data 150 with reference data corresponding to the matched reference identification information item. If target data 150 does not match the reference data, it means that target data 150 has not been yet stored in persistent storage device 130. In this case, at 350, processor 110 may determine storage information 180 as indicating to store target data 150 and check information 160 in persistent storage device 130. If target data 150 matches the reference data, it means that target data 150 has been stored in persistent storage device 130. In this case, at 360, processor 110 may determine storage information 180 as indicating not to store target data 150 and check information 160 in persistent storage device 130.

In some embodiments, in a case where storage information 180 indicates to store target data 150 and check information 160 in persistent storage device 130, processor 110 may append check information 160 to target data 150 to obtain data to be stored. Further, processor 110 may store the data to be stored in persistent storage device 130. Therefore, when target data 150 is read from persistent storage device 130 in the future, check information 160 may be used to perform a consistency check on read target data 150.

In this way, this solution may determine check information and identification information simultaneously in a data loading cycle during the preprocessing of dirty storage page data, so as to avoid cyclically traversing the dirty storage page data twice for the check information and the identification information. Because a single cycle is used to replace two cycles for storage page refreshing, the amount of data to be loaded may be halved, thereby reducing CPU loads, saving CPU cycles, improving CPU efficiency, and improving IO performance. The embodiments of the present disclosure will be specifically described below with reference to the accompanying drawings.

Figure 4:
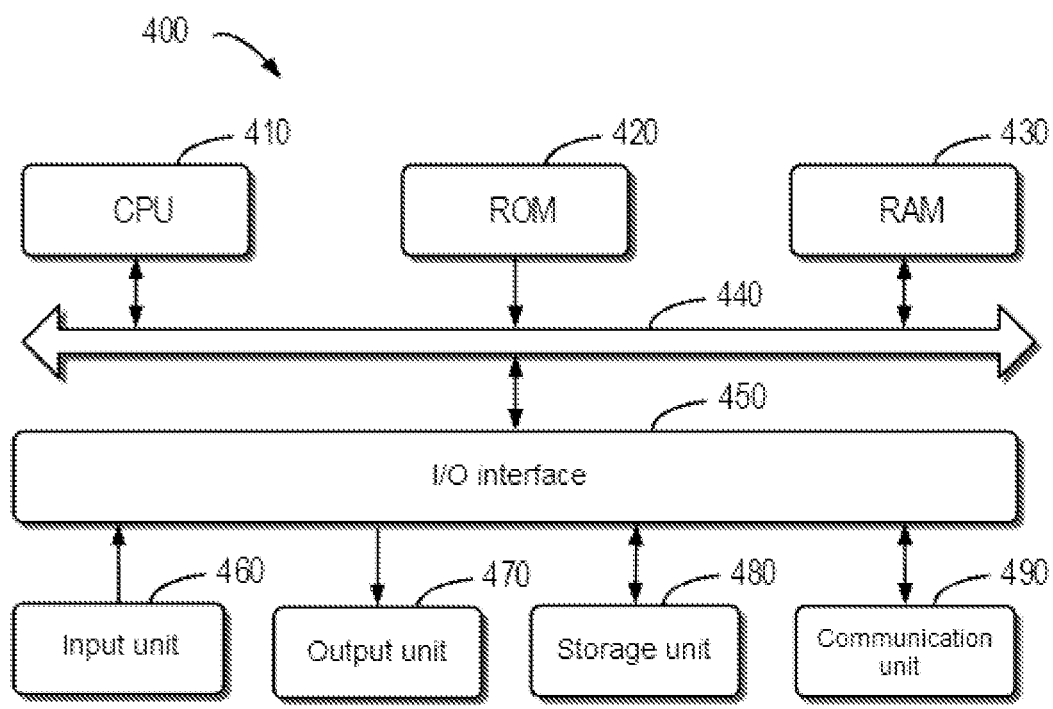
FIG. 4 shows a schematic block diagram of an example device that may be used to implement an embodiment of the present disclosure.

FIG. 4 shows a schematic block diagram of example device 400 that may be used to implement an embodiment of the present disclosure. For example, processor 110 as shown in FIG. 1 may be implemented by device 400. As shown in the figure, device 400 includes CPU 410 that may perform various appropriate actions and processing according to computer program instructions stored in read-only memory (ROM) 420 or computer program instructions loaded from storage unit 480 to random access memory (RAM) 430. In RAM 430, various programs and data required for the operation of device 400 may also be stored. CPU 410, ROM 420, and RAM 430 are connected to each other through bus 440. Input/output (I/O) interface 450 is also connected to bus 440.

A plurality of components in device 400 are coupled to I/O interface 450, including: input unit 460, such as a keyboard and a mouse; output unit 470, such as various types of displays and speakers; storage unit 480, such as a magnetic disk and an optical disc; and communication unit 490, such as a network card, a modem, and a wireless communication transceiver. Communication unit 490 allows device 400 to exchange information/data with other devices over a computer network such as the Internet and/or various telecommunication networks.

The various processes and processing described above, such as processes 200 and 300, may be executed by processing unit 410. For example, in some embodiments, processes 200 and 300 may be implemented as a computer software program that is tangibly included in a machine-readable medium, for example, storage unit 480. In some embodiments, part or all of the computer program may be loaded and/or installed onto device 400 through ROM 420 and/or communication unit 490. When the computer program is loaded into RAM 430 and executed by CPU 410, one or more actions of processes 200 and 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages such as Java, Smalltalk, and C++, as well as conventional procedural programming languages such as C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated various embodiments. The selection of terms used herein is intended to best explain the principles and practical applications of the embodiments or technical improvements to technologies in the market, or to enable other persons of ordinary skill in the art to understand the embodiments disclosed herein.

The invention claimed is:

1. A method for storage management, comprising:
   acquiring target data in a target storage page in a memory;
   determining, based on the target data, check information and identification information associated with the target data, the check information being used to verify whether the target data is correct and the identification information being used to identify the target data; and
   determining, based on the identification information, storage information associated with the target data and the check information, the storage information indicating whether to store the target data and the check information to a persistent storage device,
   wherein determining the check information and the identification information includes:
      cyclically loading each of a plurality of portions of the target data from the memory into a register;
      for each of the portions of the target data when loaded in the register, performing both a check operation and a hash operation, the check operation creating a respective first intermediate value and the hash operation creating a respective second intermediate value, the first intermediate value being accumulated into a first group of intermediate values, and the second intermediate value being accumulated into a second group of intermediate values; and
      subsequently determining the check information from the first group of intermediate values, and determining the identification information from the second group of intermediate values.

2. The method according to claim 1, wherein determining the storage information comprises:
   acquiring a group of reference identification information items associated with corresponding reference data in a group of reference storage pages that have been stored in the persistent storage device;
   comparing the identification information with the group of reference identification information items respectively; and
   if the identification information matches one of the group of reference identification information items, determining the storage information as indicating not to store the target data and the check information in the persistent storage device.

3. The method according to claim 1, wherein determining the storage information comprises:
   acquiring a group of reference identification information items associated with corresponding reference data in a group of reference storage pages that have been stored in the persistent storage device;
   comparing the identification information with the group of reference identification information items respectively; and
   if the identification information matches one of the group of reference identification information items, comparing the target data with reference data corresponding to the matched reference identification information item; and
   if the target data matches the reference data, determining the storage information as indicating not to store the target data and the check information in the persistent storage device.

4. The method according to claim 1, wherein the storage information indicates to store the target data and the check information in the persistent storage device, and the method further comprises:
  adding the check information to the target data to obtain data to be stored; and
  storing the data to be stored into the persistent storage device.

5. The method according to claim 1, further comprising:
  determining whether the number of at least one candidate storage page in the memory exceeds a threshold number; and
  if the number exceeds the threshold number, determining the target storage page from the at least one candidate storage page.

6. An electronic device, comprising:
  at least one processing unit; and
  at least one memory that is coupled to the at least one processing unit and stores instructions for execution by the at least one processing unit, wherein the instructions, when executed by the at least one processing unit, cause the device to perform actions including:
    acquiring target data in a target storage page in a memory;
    determining, based on the target data, check information and identification information associated with the target data, the check information being used to verify whether the target data is correct and the identification information being used to identify the target data; and
    determining, based on the identification information, storage information associated with the target data and the check information, the storage information indicating whether to store the target data and the check information to a persistent storage device,
    wherein determining the check information and the identification information includes:
      cyclically loading each of a plurality of portions of the target data from the memory into a register;
      for each of the portions of the target data when loaded in the register, performing both a check operation and a hash operation, the check operation creating a respective first intermediate value and the hash operation creating a respective second intermediate value, the first intermediate value being accumulated into a first group of intermediate values, and the second intermediate value being accumulated into a second group of intermediate values; and
      subsequently determining the check information from the first group of intermediate values, and determining the identification information from the second group of intermediate values.

7. The device according to claim 6, wherein determining the storage information comprises:
  acquiring a group of reference identification information items associated with corresponding reference data in a group of reference storage pages that have been stored in the persistent storage device;
  comparing the identification information with the group of reference identification information items respectively; and
  if the identification information matches one of the group of reference identification information items, determining the storage information as indicating not to store the target data and the check information in the persistent storage device.

8. The device according to claim 6, wherein determining the storage information comprises:
  acquiring a group of reference identification information items associated with corresponding reference data in a group of reference storage pages that have been stored in the persistent storage device;
  comparing the identification information with the group of reference identification information items respectively;
  if the identification information matches one of the group of reference identification information items, comparing the target data with reference data corresponding to the matched reference identification information item; and
  if the target data matches the reference data, determining the storage information as indicating not to store the target data and the check information in the persistent storage device.

9. The device according to claim 6, wherein the storage information indicates to store the target data and the check information in the persistent storage device, and the actions further comprise:
  adding the check information to the target data to obtain data to be stored; and
  storing the data to be stored into the persistent storage device.

10. The device according to claim 6, wherein the actions further comprise:
  determining whether the number of at least one candidate storage page in the memory exceeds a threshold number; and
  if the number exceeds the threshold number, determining the target storage page from the at least one candidate storage page.

11. A computer program product having a non-transitory computer readable medium which stores a set of instructions to perform storage management; the set of instructions, when carried out by computerized circuitry, causing the computerized circuitry to perform a method of:
  acquiring target data in a target storage page in a memory;
  determining, based on the target data, check information and identification information associated with the target data, the check information being used to verify whether the target data is correct and the identification information being used to identify the target data; and
  determining, based on the identification information, storage information associated with the target data and the check information, the storage information indicating whether to store the target data and the check information to a persistent storage device,
  wherein determining the check information and the identification information includes:
    cyclically loading each of a plurality of portions of the target data from the memory into a register;
    for each of the portions of the target data when loaded in the register, performing both a check operation and a hash operation, the check operation creating a respective first intermediate value and the hash operation creating a respective second intermediate value, the first intermediate value being accumulated into a first group of intermediate values, and the second intermediate value being accumulated into a second group of intermediate values; and
    subsequently determining the check information from the first group of intermediate values, and determining the identification information from the second group of intermediate values.

* * * * *